United States Patent
Sugaya (10) Patent No.: US 10,643,328 B2
(45) Date of Patent: May 5, 2020

(54) COMPUTER SYSTEM, AND METHOD AND PROGRAM FOR DIAGNOSING OBJECTS

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 0 days.

(21) Appl. No.: 15/776,437

(22) PCT Filed: Oct. 31, 2016

(86) PCT No.: PCT/JP2016/082303
§ 371 (c)(1),
(2) Date: May 16, 2018

(87) PCT Pub. No.: WO2018/078868
PCT Pub. Date: May 3, 2018

(65) Prior Publication Data
US 2018/0350053 A1    Dec. 6, 2018

(51) Int. Cl.
*G06T 7/00* (2017.01)
*G06T 7/90* (2017.01)
*G06K 9/62* (2006.01)
*G06K 9/46* (2006.01)

(52) U.S. Cl.
CPC ............ *G06T 7/001* (2013.01); *G06K 9/46* (2013.01); *G06K 9/6202* (2013.01); *G06T 7/90* (2017.01); *G06T 2207/10024* (2013.01); *G06T 2207/10048* (2013.01)

(58) Field of Classification Search
CPC .......... G06T 2207/10048; G06T 7/001; H04N 7/181; G01J 2005/0077; G05B 19/418; G06F 11/3058; G06K 9/46
See application file for complete search history.

(56) References Cited

U.S. PATENT DOCUMENTS

2012/0320086 A1* 12/2012 Kasama ............... H04N 5/2258
345/629
2013/0169816 A1* 7/2013 Hu ....................... H05K 7/1498
348/159

(Continued)

FOREIGN PATENT DOCUMENTS

JP   2003-339648   12/2003
JP   2006-84425    3/2006

(Continued)

*Primary Examiner* — Jingge Wu
(74) *Attorney, Agent, or Firm* — Lex IP Meister, PLLC (57) ABSTRACT

The present invention is to provide a computer system, and a method and a program for diagnosing an object that is capable to improve the diagnosis accuracy of an object. The computer system acquires a visible light image of an object that is taken by a camera, analyzes the acquired visible light image by comparing the acquired visible light image with a normal visible light image of the object, identifies the type of the object based on the result of the image analysis, identifies an abnormal part of the object based on the result of the image analysis, acquires environment data of the object, and diagnoses the status of the object based on the identified type, the identified abnormal part, and the acquired environment data.

13 Claims, 10 Drawing Sheets

(56) References Cited

U.S. PATENT DOCUMENTS

| | | | | |
|---|---|---|---|---|
| 2013/0342691 | A1* | 12/2013 | Lewis | H04N 5/332 |
| | | | | 348/143 |
| 2014/0136047 | A1* | 5/2014 | Mian | G01M 17/013 |
| | | | | 701/29.1 |
| 2015/0009336 | A1* | 1/2015 | Wang | H04N 5/33 |
| | | | | 348/165 |
| 2015/0109454 | A1* | 4/2015 | Strandemar | H04N 5/332 |
| | | | | 348/164 |
| 2015/0247647 | A1* | 9/2015 | Kusukame | H04N 5/33 |
| | | | | 700/276 |
| 2015/0254860 | A1* | 9/2015 | Wang | G06K 9/6227 |
| | | | | 382/190 |
| 2016/0006951 | A1* | 1/2016 | Moghadam | G03B 35/02 |
| | | | | 348/164 |
| 2016/0262624 | A1 | 9/2016 | Nakajima et al. | |
| 2017/0352290 | A1* | 12/2017 | Sasaki | A61B 5/01 |
| 2017/0374296 | A1* | 12/2017 | Schmidt | G01J 5/025 |
| 2018/0110416 | A1* | 4/2018 | Masuda | G01J 5/0806 |
| 2019/0130183 | A1* | 5/2019 | Yoshida | G05B 19/418 |
| 2019/0159681 | A1* | 5/2019 | Sugaya | G06T 7/70 |

FOREIGN PATENT DOCUMENTS

| | | | |
|---|---|---|---|
| JP | 2011-256641 | 12/2011 | |
| JP | 2012-168799 | 9/2012 | |
| TW | 201734501 A * | 10/2017 | G01V 8/10 |
| WO | 2006/064635 | 6/2006 | |
| WO | 2015/060376 | 4/2015 | |

\* cited by examiner

DIAGNOSIS DATABASE

| Type | Date | Flow rate variation data | Temperature | Gas detection | Diagnosis |
|---|---|---|---|---|---|
| Pipe | July 7 | 20m$^3$/h | 150°C | No | — |
| | October 11 | 30m$^3$/h | 150°C | Yes | Gas leak |
| | November 11 | 30m$^3$/h | 250°C | No | Overload |
| | ... | ... | ... | ... | ... |

COMPUTER SYSTEM, AND METHOD AND PROGRAM FOR DIAGNOSING OBJECTS

TECHNICAL FIELD

The present invention relates to a computer system, and a method and a program for diagnosing an object based on an image.

BACKGROUND ART

In recent years, whether or not a building etc., is abnormal has been checked by taking a still or moving image of the building and analyzing this image.

Such a system for diagnosing a building, in which the status of a hollow in the wall is taken with a camera unit, is disclosed (refer to Patent Document 1).

CITATION LIST

Patent Literature

Patent Document 1: JP 2011-256641A

SUMMARY OF INVENTION

However, the constitution of the system of Patent Document 1 hardly checks a gas leak, an unusual odor, etc., from the pipe based on the image.

An objective of the present invention is to provide a computer system, and a method and a program for diagnosing an object that is capable to improve the diagnosis accuracy of an object.

The present invention provides a computer system including:

a first image acquisition unit that acquires a visible light image of an object that is taken by a camera;

an image analysis unit that analyzes the acquired visible light image by comparing the acquired visible light image with a normal visible light image of the object;

an object identification unit that identifies the type of the object based on the result of the image analysis;

an abnormal part identification unit that identifies an abnormal part of the object based on the result of the image analysis;

an environment data acquisition unit that acquires environment data of the object; and a first diagnosis unit that diagnoses the status of the object based on the identified type, the identified abnormal part, and the acquired environment data.

According to the present invention, the computer system acquires a visible light image of an object that is taken by a camera, analyzes the acquired visible light image by comparing the acquired visible light image with a normal visible light image of the object, identifies the type of the object based on the result of the image analysis, identifies an abnormal part of the object based on the result of the image analysis, acquires environment data of the object, and diagnoses the status of the object based on the identified type, the identified abnormal part, and the acquired environment data.

The present invention is the category of a computer system, but the categories of a method, a program, etc., for diagnosing an object have similar functions and effects.

The present invention can provide a computer system, and a method and a program for diagnosing an object that is capable to improve the diagnosis accuracy of an object.

DESCRIPTION OF EMBODIMENTS

Embodiments of the present invention will be described below with reference to the attached drawings. However, this is illustrative only, and the technological scope of the present invention is not limited thereto.

Overview of System for Diagnosing an Object 1

Figure 1:
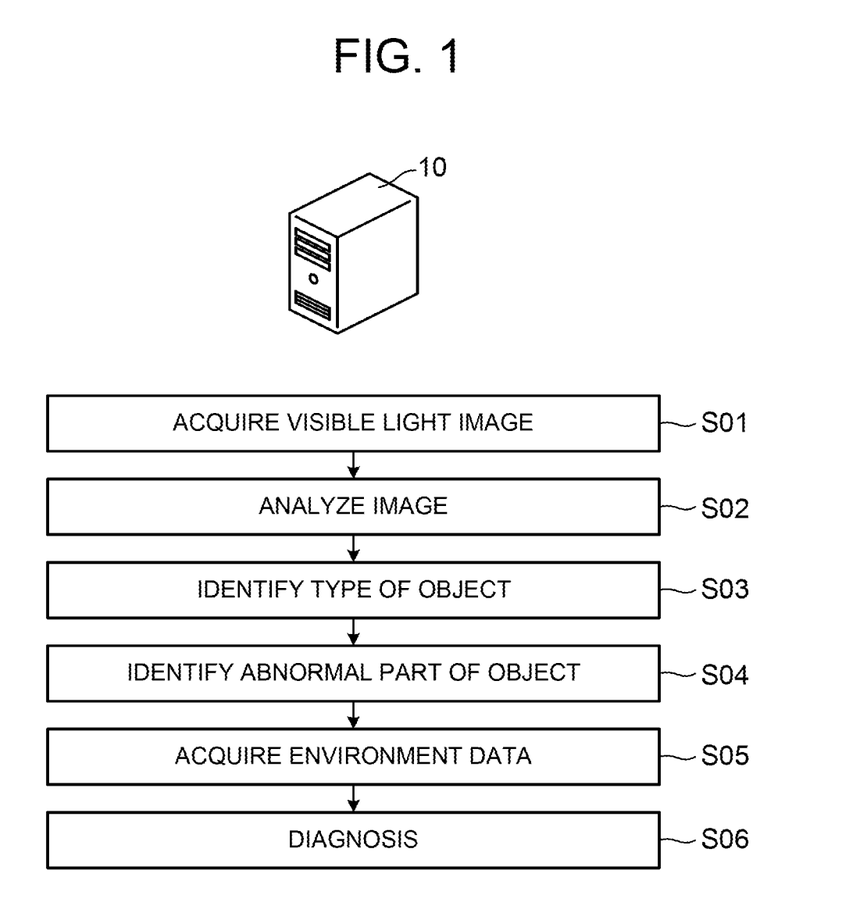
FIG. 1 shows a schematic diagram of the system for diagnosing an object 1.

A preferable embodiment of the present invention will be described below with reference to FIG. 1. FIG. 1 shows an overview of the system for diagnosing an object 1 according to a preferable embodiment of the present invention. The system for diagnosing an object 1 includes a computer 10, which acquires the image of an object and diagnoses the status of this object.

The computer 10 is a computing device that is communicatively connected with, for example, a camera such as a visible camera or an infrared camera and a sensor that are not shown in the drawings. The system for diagnosing an object 1 acquires a visible light image from the visible camera, an infrared image from the infrared camera, at least one environmental datum from the group consisting of the date on which the visible light image and the infrared image were acquired from a sensor, flow rate variation data that indicates change in flow rate in a pipe on the date, thermal data detected by a temperature sensor on the date, and gas data detected by a gas sensor on the date.

First, the computer 10 acquires a visible light image taken by a camera not shown in the drawings (Step S01). The computer 10 acquires a visible light image such as a moving or still image of an object that a visible camera takes.

The computer 10 may acquire an infrared image such as a moving or still image of an object that an infrared camera takes in addition to a visible light image. The visible camera and the infrared camera may be achieved by one imaging device. The visible camera and the infrared camera which are placed next or close to each other may take an image of a same object. In other words, the visible camera and the infrared camera take an image of a same object from an approximately same imaging location.

The computer 10 analyzes the image by comparing the acquired visible light image with a normal visible light image of the object (Step S02). The computer 10 compares the feature amount and the color of the acquired visible light image with those of the normal visible light image. The computer 10 compares the feature amount and the color of the acquired visible light image with those of two or more normal visible light images. The feature amount and the color of a normal visible light image of an object are associated with various kinds of information to identify the type, the classification, the name, etc., of the object.

The computer 10 may compare the temperatures in addition to the feature amounts and the colors. In this case, the computer 10 only has to acquire an infrared image in addition to a visible light image, extract the temperature from the infrared image, and compare the extracted temperature with the temperature from a normal infrared image of the object.

As the result of the image analysis, the computer 10 identifies the type of the object (Step S03). The computer 10 identifies the feature amount and the color of the acquired visible light image that match those of a normal visible light image of the object and then the type of the object that is associated with the identified visible light image as the type of the object that is contained in the acquired visible light image, by the above-mentioned image analysis. The computer 10 identifies the feature amount and the color of a normal visible light image of the object that are the same as or similar to those of the acquired visible light image.

As the result of the image analysis, the computer 10 identifies an abnormal part of the object (Step S04). The computer 10 identifies the part that has a feature amount and a color in the acquired visible light image that are different from those of the normal status of the object as an abnormal part, by the above-mentioned image analysis.

The computer 10 may identify an abnormal part of the object based on the temperature from the acquired infrared image as described above. In this case, the computer 10 only has to compare the extracted temperature with the temperature from a normal infrared image of the object and identify the part where the temperature is abnormal as an abnormal part based on, for example, whether or not the difference between the temperatures falls within a predetermined range or whether or not the extracted temperature is equal to the reference temperature.

The computer 10 acquires the environment data of the object (Step S05). The computer 10 acquires at least one environmental datum on the environment where an object is placed, from the group consisting of the date on which the visible light image and the infrared image were acquired from a sensor, flow rate variation data that indicates change in flow rate in a pipe on the date, thermal data detected by a temperature sensor on the date, and gas data detected by a gas sensor on the date.

The computer 10 diagnoses the status of the object based on the identified type of the object, the identified abnormal part, and the acquired environment data (Step S06). The computer 10 diagnoses the status of the object by referring to the diagnosis database in which the type of an object is previously associated with an abnormal part, environment data, and a diagnosis result. The computer 10 diagnoses the object by extracting a diagnosis result associated with the identified type of the object, the identified abnormal part, and the acquired environment data from the diagnosis database.

System Configuration of System for Diagnosing an Object 1

Figure 2:
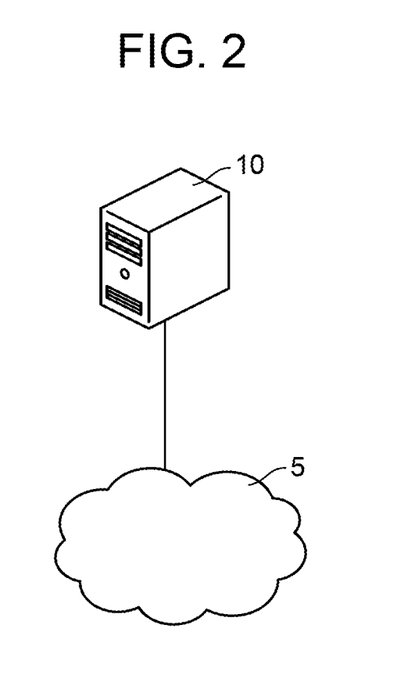
FIG. 2 shows an overall configuration diagram of the system for diagnosing an object 1.

A system configuration of the system for diagnosing an object 1 according to a preferable embodiment will be described below with reference to FIG. 2. FIG. 2 shows a block diagram illustrating the system for diagnosing an object 1 according to a preferable embodiment of the present invention. The system for diagnosing an object 1 includes a computer 10 and a public line network 5 (e.g. the Internet network, a third and a fourth generation networks), which acquires the image of an object and diagnoses this object.

The system for diagnosing an object 1 is data-communicatively connected with a camera such as a visible camera that takes a visible light image such as a moving or still image of the object and a sensor that detects at least one environmental datum on the environment where an object is placed, from the group consisting of the date on which the visible light image and the infrared image were acquired, flow rate variation data that indicates change in flow rate in a pipe on the date, thermal data detected by a temperature sensor on the date, and gas data detected by a gas sensor on the date. The computer 10 acquires various data from the camera and the sensor.

The computer 10 is the above-mentioned computing device with the functions to be described later.

Functions

Figure 3:
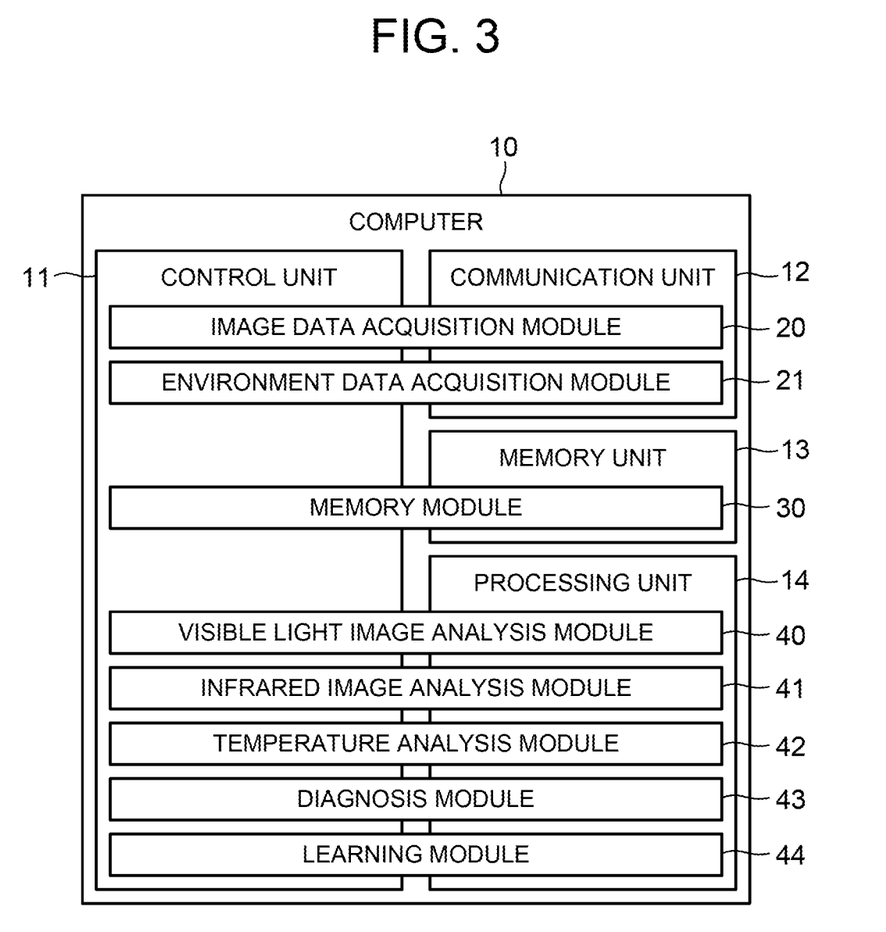
FIG. 3 shows the functional block diagram of the computer 10.

The functions of the system for diagnosing an object 1 according to a preferable embodiment will be described below with reference to FIG. 3. FIG. 3 shows the functional block diagram of the computer 10.

The computer 10 includes a control unit 11 provided with a central processing unit (hereinafter referred to as "CPU"), a random access memory (hereinafter referred to as "RAM"), and a read only memory (hereinafter referred to as "ROM"); and a communication unit 12 such as a device that is capable to communicate with other devices (e.g., camera, sensor), for example, a Wireless Fidelity or Wi-Fi® enabled device complying with IEEE 802.11. The computer 10 also includes a memory unit 13 such as a hard disk, a semiconductor memory, a record medium, or a memory card to store data. The memory unit 13 stores various databases to be described later. The computer 10 also includes a processing unit 14 provided with devices that perform various processes such as image processing and status diagnosis.

In the computer 10, the control unit 11 reads a predetermined program to achieve an image data acquisition module 20 and an environment data acquisition module 21 in cooperation with the communication unit 12. Furthermore, in the computer 10, the control unit 11 reads a predetermined program to achieve a memory module 30 in cooperation with the memory unit 13. Furthermore, in the computer 10, the control unit 11 reads a predetermined program to achieve a visible light image analysis module 40, an infrared image analysis module 41, a temperature analysis module 42, a diagnosis module 43, and a learning module 44 in cooperation with the processing unit 14.

Object Diagnosis Process

Figure 4:
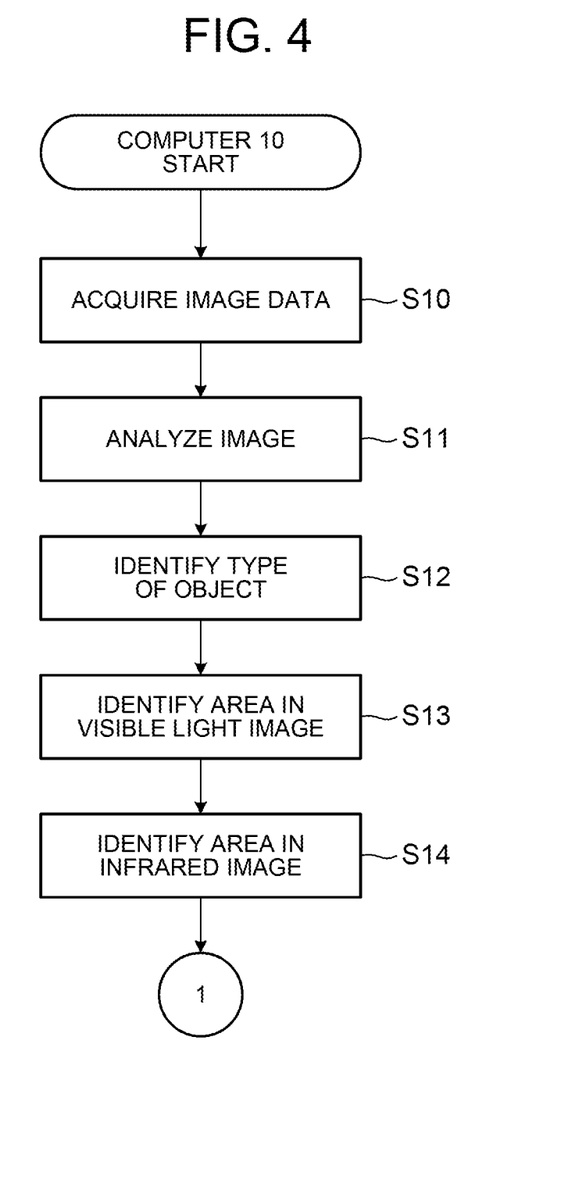
FIG. 4 shows a flow chart illustrating the object diagnosis process performed by the computer 10.
Figure 5:
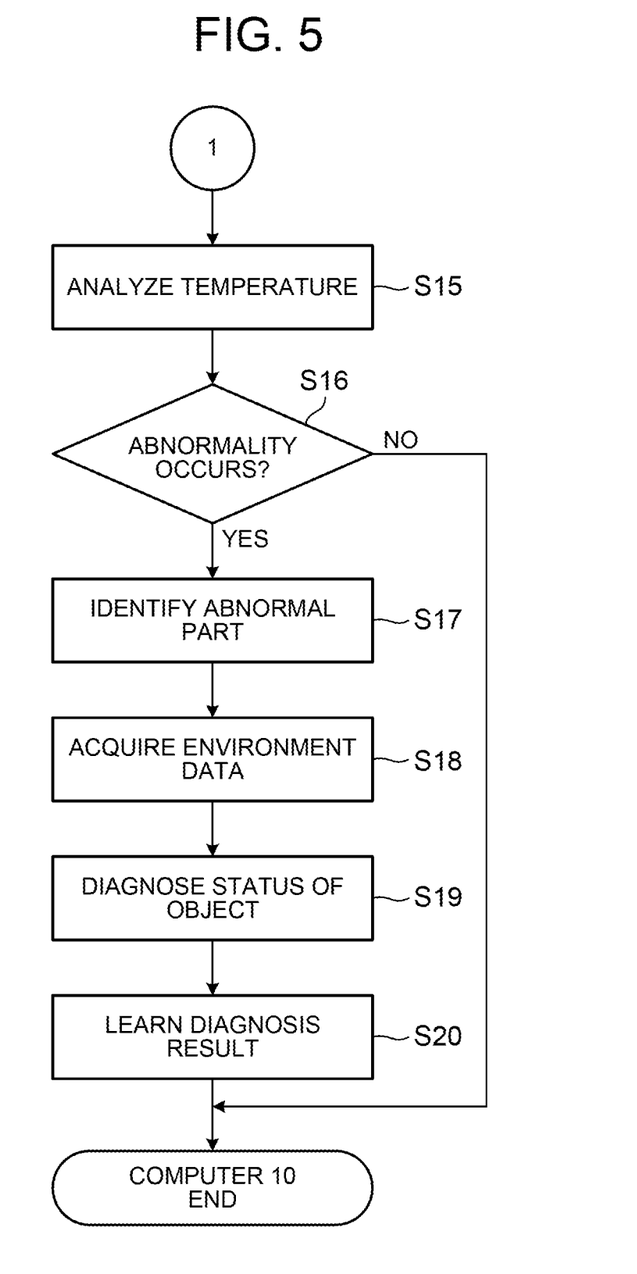
FIG. 5 shows a flow chart illustrating the object diagnosis process performed by the computer 10.

The object diagnosis process performed by the system for diagnosing an object 1 will be described below with reference to FIGS. 4 and 5. FIGS. 4 and 5 show a flow chart illustrating the object diagnosis process performed by the computer 10. The tasks executed by the modules will be described below with this process. The following description assumes that the system for diagnosing an object 1 diagnose a factory facility that has a pipe as an object.

First, the image data acquisition module 20 acquires image data on the visible light image and infrared image of an object (Step S10). In the step S10, the image data acquisition module 20 acquires visible light image data on the visible light image taken by a visible camera. The image data acquisition module 20 also acquires infrared image data on the infrared image taken by an infrared camera. The image data acquisition module 20 acquires image data at predetermined intervals or at two or more time points such previously set times. The image data that the image data acquisition module 20 acquires are taken from a same imaging point, which are image data on a same object. The following description assumes that the computer 10 diagnoses an object based on image data acquired at a predetermined time point.

The image data acquisition module 20 may acquire only visible light image data. In this case, the process that uses infrared image data to be described later only has to be omitted.

Figure 6:
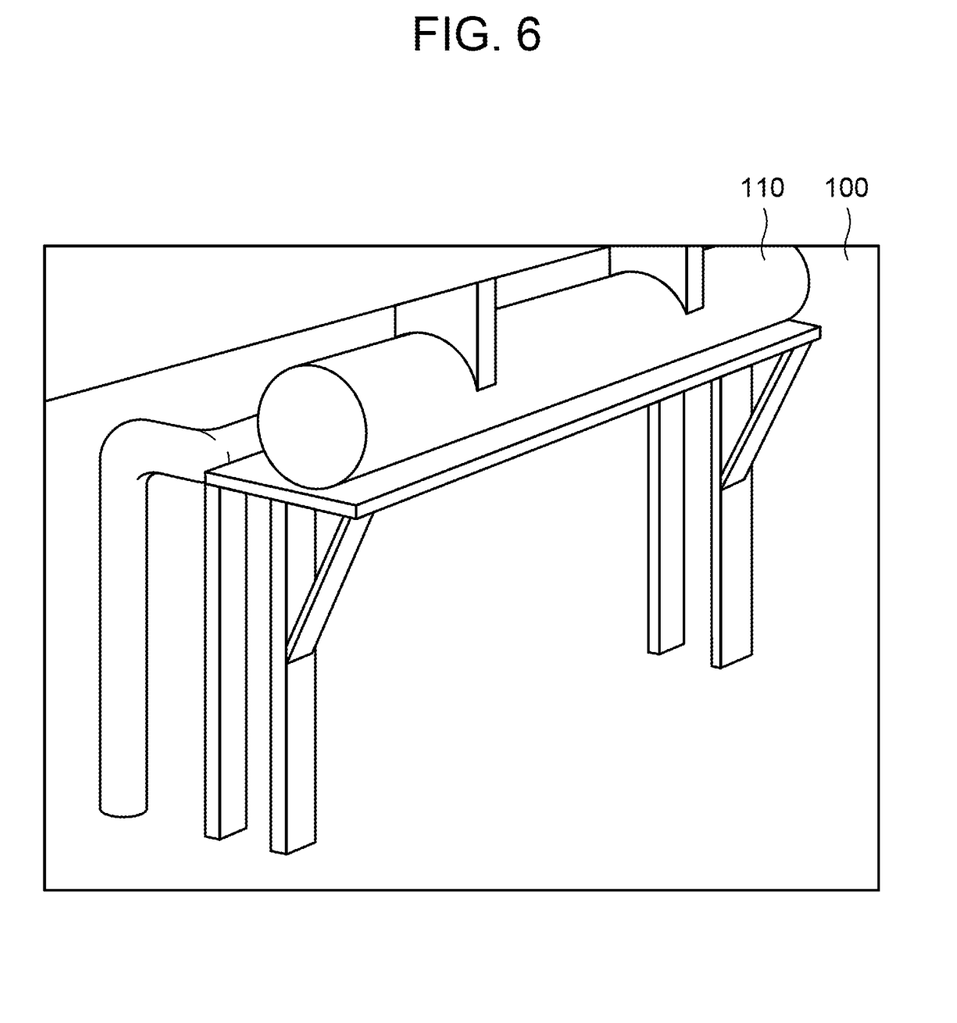
FIG. 6 shows a diagram schematically illustrating an example of the visible light image data acquired by the computer 10.

The visible light image data of an object that the image data acquisition module 20 acquires will be described with reference to FIG. 6. FIG. 6 shows a diagram schematically illustrating an example of the visible light image data of an object that the image data acquisition module 20 acquires. In FIG. 6, the image data acquisition module 20 acquires a visible light image 100 that the visible light image data indicate. The visible light image 100 contains an object 110. The visible light image 100 may contain scenery, a natural object, and an artificial object other than the object 110. However, these objects are omitted for ease of explanation. The visible light image 100 may also contain two or more objects 110 or different types of objects from the object 110.

Figure 7:
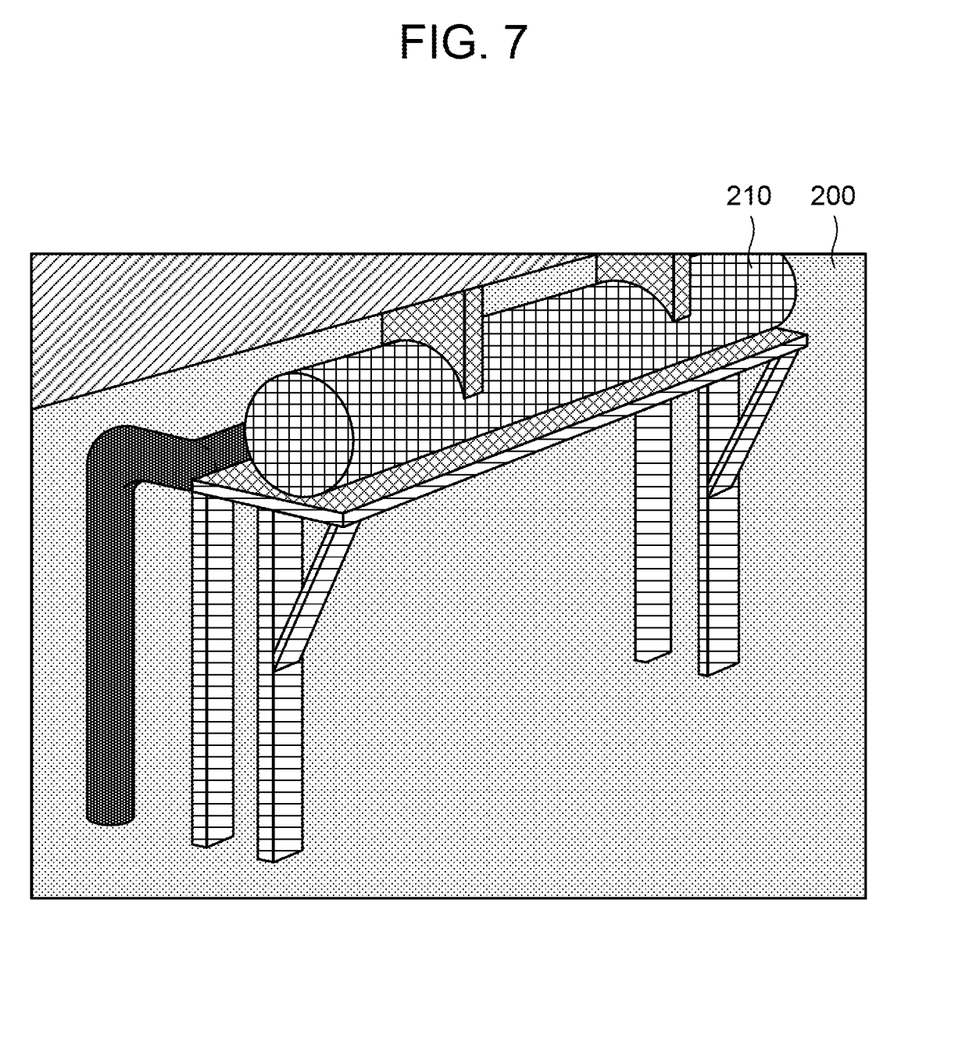
FIG. 7 shows a diagram schematically illustrating an example of the infrared image data acquired by the computer 10.

The infrared image data of an object that the image data acquisition module 20 acquires will be described with reference to FIG. 7. FIG. 7 shows a diagram schematically illustrating an example of the infrared image data of an object that the image data acquisition module 20 acquires. In FIG. 7, the image data acquisition module 20 acquires an infrared image 100 that the infrared image data indicate. The infrared image 200 contains an object 210. The infrared image 200 is hatched to conveniently show the temperatures. The infrared image 200 may contain scenery, a natural object, and an artificial object other than the object 210. However, these objects are omitted for ease of explanation. The infrared image 200 may also contain two or more objects 210 or different types of objects from the object 210.

The visible light image analysis module 40 analyzes the acquired visible light image (Step S11). In the step S11, the visible light image analysis module 40 compares the acquired visible light image with the visible light image of the normal status of the object that the memory module 30 previously stores. The visible light image of the normal status of an object is of a part or the whole of each type or each element of an object such as a wall, a pipe, a support device, a mounting, or a bracket in the normal status, which is taken by a visible camera. The memory module 30 associates and stores a visible light image on the normal status of an object with various kinds of information to identify the type, the element, etc., of the object. The visible light image analysis module 40 extracts the feature amounts such as the shape and the size and the color of each part of the acquired visible light image. The visible light image analysis module 40 also extracts the feature amount and the color of each part of the visible light image that the memory module 30 stores. The visible light image analysis module 40 compares the feature amount and the color that are extracted from the acquired visible light image with those from the stored visible light image.

The visible light image analysis module 40 recognizes the shape of an object contained in the visible light image by subjecting the acquired visible light image to edge analysis, etc. The visible light image analysis module 40 also recognizes the shape of an object contained in the visible light image by subjecting the visible light image stored in the memory module 30 to edge analysis, etc. The visible light image analysis module 40 compares the shapes. Furthermore, the visible light image analysis module 40 also recognizes the RGB value of the acquired visible light image by subjecting this visible light image to color extraction, etc. The visible light image analysis module 40 also recognizes the RGB value of the visible light image stored in the memory module 30 by subjecting this visible light image to color extraction, etc. The visible light image analysis module 40 compares the RGB values.

The visible light image analysis module 40 identifies the type of the object based on the result of the image analysis (Step S12). In the step S12, the stored visible light image with a feature amount and a color that are the same as or similar to those extracted from the acquired visible light image. The visible light image analysis module 40 acquires various kinds of information that identifies an object associated with the visible light image.

If recognizing two or more elements of an object in the visible light image, the visible light image analysis module 40 performs the above-mentioned steps S11 and S12 on each element to identify the type of each element.

The computer 10 may identify the type of an object based on the acquired infrared image. In this case, the computer 10 only has to identify the stored infrared image with a temperature that is the same as or similar to the temperature recognized from the acquired infrared image by comparing the temperature of each part of the acquired infrared image with that of the normal status of the infrared image that the memory module 30 stores and then identify an object associated with the identified infrared image. If two or more elements of an object are contained in the infrared image, the computer 10 only has to perform this process on each element. The computer 10 may identify the type of an object based on the acquired visible light image and infrared image. In this case, the computer 10 only has to combine and perform the processes for a visible light image and an infrared image that the computer 10 performs as described above.

The visible light image analysis module 40 identifies areas corresponding to two or more predetermined parts of an object in the visible light image (Step S13). In the step S13, the predetermined parts include a part and a previously set part of a structure such as a wall, a pipe, a support device, a mounting, or a bracket. The visible light image analysis module 40 recognizes the position in the visible light image of a part or previously set part of a structure based on the feature amount and identifies this recognized position as an area corresponding to the predetermined part. The visible light image analysis module 40 recognizes the position in the visible light image of a part or previously set part of a structure based on the color and identifies this recognized position as an area corresponding to the predetermined part. The visible light image analysis module 40 identifies two or more areas corresponding to the respective predetermined parts.

Figure 8:
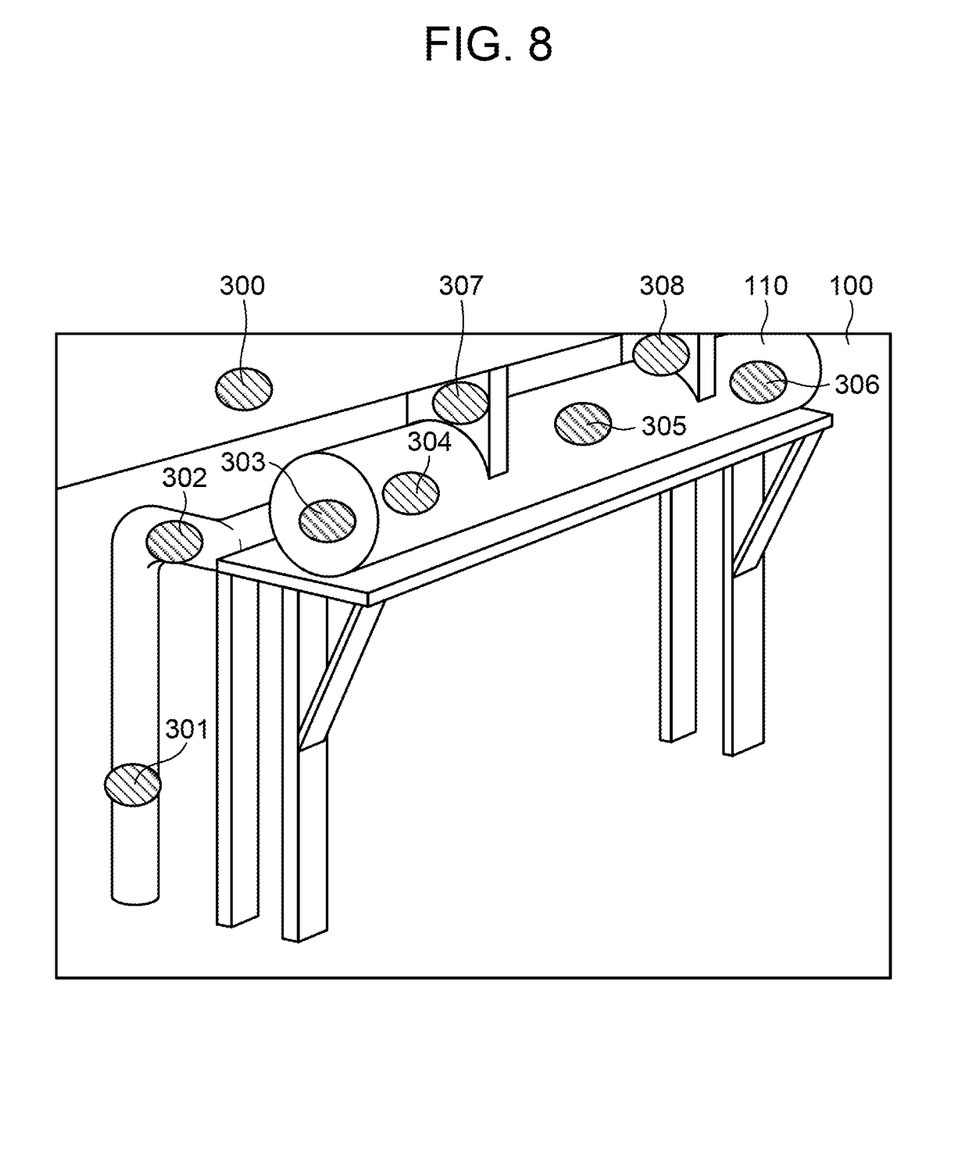
FIG. 8 shows a diagram schematically illustrating an example of the identified predetermined parts in a visible light image that the computer 10 identifies.

The areas corresponding to the respective predetermined parts that the visible light image analysis module 40 identifies will be described with reference to FIG. 8. FIG. 8 shows a diagram schematically illustrating an example of the status of a predetermined part that the visible light image analysis module 40 identifies. In FIG. 8, the visible light image analysis module 40 identifies areas in a visible light image 100 in which predetermined parts such as a wall, a pipe, and a support device are placed, based on the extracted feature amount and color. Specifically, the visible light image analysis module 40 identifies areas corresponding to the parts: the wall 300, the pipes 301 to 306, and the support devices 307, 308 of the object 110. In FIG. 8, the identified areas are conveniently shown by hatching. The areas each indicate a part of each part but may indicate the whole. The number, the type, and the position of each part to be identified can be appropriately changed.

If recognizing two or more elements of an object in the visible light image, the visible light image analysis module 40 only has to perform this process on each element. Moreover, the visible light image analysis module 40 may recognize not only elements but also the positional relationship among the elements. The positional relationship only has to be recognized based on, for example, the distances from the imaging location and the coordinates in a visible light image.

The infrared image analysis module 41 identifies an area in the infrared image that corresponds to the identified area in a visible light image (Step S14). In the step S14, the infrared image analysis module 41 identifies an area of the infrared image that corresponds to the identified area of each part of the object by comparing the visible light image with the infrared image. The infrared image analysis module 41 acquires the position of an area in the visible light image in a coordinate and identifies a position of this coordinate as an area in the infrared image that corresponds to the identified area in the visible light image.

Figure 9:
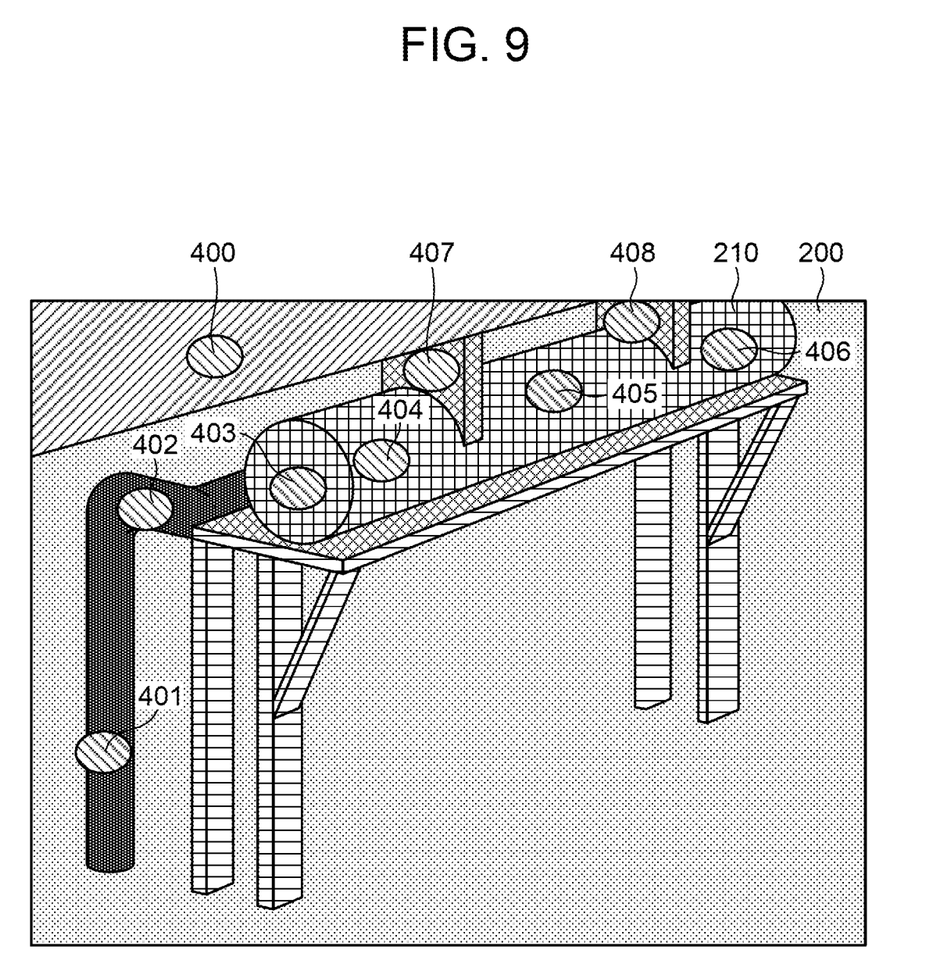
FIG. 9 shows a diagram schematically illustrating an example of the identified areas that the computer 10 identifies based on infrared image data.

The area in the infrared image that corresponds to that in the visible light image that the infrared image analysis module 41 identifies with reference to FIG. 9. FIG. 9 shows a diagram schematically illustrating an example of the status of an area that the infrared image analysis module 41 identifies based on infrared image data. In FIG. 9, the areas in the infrared image 200 that correspond to the identified parts: the wall 300, the pipes 301 to 306, and the support devices 307, 308 of the object 110 in the visible light image 100 as described above. The areas are identified by comparing the position in the visible light image 100 with that in the infrared image 200. The infrared image analysis module 41 acquires the position coordinate of each part in the visible light image 100 and identifies a position in the infrared image that corresponds to the acquired position coordinate as an area in the infrared image that corresponds to the identified area in the visible light image. Specifically, the infrared image analysis module 41 identifies the parts: the wall 400, the pipes 401 to 406, and the support devices 407, 408 of the object 210. In FIG. 9, the identified areas are conveniently shown by hatching. These areas indicate some or all of the identified parts in the visible light image as described above. The number, the types, and the positions of parts to be identified can be appropriately changed in the same way as the visible light image.

The temperature analysis module 42 analyzes the temperature of the identified area in the infrared image (Step S15). In the step S15, the temperature analysis module 42 acquires the temperature of each area based on the infrared image and identifies the temperature of each area.

The diagnosis module 43 diagnoses the object based on the temperature of the identified area in the infrared image and checks whether or not an abnormality occurs (Step S16). In the step S16, the diagnosis module 43 diagnoses the object based on the acquired temperature of the each area.

The diagnosis module 43 diagnoses the object based on the reference temperature in the normal status of the object that corresponds to each part that the memory module 30 stores. The diagnosis module 43 calculates the temperature difference between the temperature of the identified area in the infrared image and the reference temperature corresponding to this area and checks whether or not the calculated temperature difference falls into a predetermined range (e.g., 0.5° C., 1° C., 2° C., 10° C. or less). If the temperature difference falls within a predetermined range, the diagnosis module 43 determines that no abnormality occurs. If not, the diagnosis module 43 determines that an abnormality occurs.

The diagnosis module 43 may diagnose the object by a method other than the above-mentioned diagnosis based on the reference temperature. For example, the object may be diagnosed based on only the temperature of the identified area in the infrared image. If two or more elements of an object, the object may be diagnosed based on the temperature of each element. Alternatively, the object may be diagnosed by combining two or more elements. For example, if detecting an abnormal temperature in the identified area in the infrared image, the diagnosis module 43 determines that an abnormality occurs. Moreover, the diagnosis module 43 compares the temperature of an area in an identified first element with that in an identified second element in the infrared image and calculates the temperature difference. If the calculated temperature difference is an abnormal value, the diagnosis module 43 determines that an abnormality occurs in any one or both of the first and second elements.

The diagnosis module 43 diagnoses the object based on one visible light image and one infrared image but may diagnose it based on any one or both of two or more visible light images and two or more infrared images acquired within a predetermined period. In this case, the diagnosis module 43 only has to diagnose the object based on the feature amount, the color, the temperature change, the variation width, or the change of the element that is acquired from any one or both of the visible light image and the infrared image. The diagnosis module 43 may diagnose the object by the average temperature of the elements or the parts that is acquired from two or more infrared images. Specifically, the diagnosis module 43 only has to calculate the temperature difference between the average temperature and the reference temperature by comparing the average temperature of the elements or the parts with the reference temperature and diagnose the object based on whether or not the temperature difference falls within a predetermined range. The diagnosis module 43 may diagnose the object by a method not limited to the above-mentioned methods.

The diagnosis module 43 may diagnose the object based on only the visible light image without using the infrared image. In this case, the diagnosis module 43 only has to check whether or not an abnormality occurs by comparing the feature amount, the color, etc., of each part or a previously set part contained in the visible light image that the visible light image analysis module 40 extracts as described above with those of the identified type of the object.

If determining that no abnormality occurs (NO) in the step S16, the diagnosis module 43 ends this process. In the step S16, the computer 10 may transmit a notification indicating that no abnormality occurs in the object, to an external terminal, etc., not shown in the drawings. The external terminal may notify the user by displaying the notification on the display unit of the external terminal or by outputting voices.

On the other hand, if determining that an abnormality occurs (YES) in the step S16, the diagnosis module 43 identifies the abnormal part of the object as the part of the object in which an abnormality occurs (Step S17). In the step S17, the diagnosis module 43 identifies an abnormal part based on any one or both of the feature amount or the color of each part that is extracted from the visible light image and the temperature of each identified part in the infrared image. The diagnosis module 43 identifies the part in which the feature amount or the color of each of the extracted parts is different from that of the normal status of the object, as an abnormal part. The diagnosis module 43 also identifies the part in which the temperature of each of the identified parts is different from the normal temperature of the object, as an abnormal part.

The environment data acquisition module 21 acquires environment data indicating the environment where an object is placed (Step S18). In the step S18, the environment data acquisition module 21 acquires at least one as the environment data from the group consisting of the date on which the visible light image and the infrared image were acquired, flow rate variation data that indicates change in flow rate in a pipe on the date, thermal data detected by a temperature sensor on the date, and gas data detected by a gas sensor on the date. The environment data acquisition module 21 acquires environment data from sensors such as a clock, a flowmeter, a gas detector, a thermometer, a hygrometer, and a barometer that are not shown in the drawings. These sensors are placed near an object or the place where an object is embedded.

The environment data acquisition module 21 may acquire environment data at other timing. For example, the environment data acquisition module 21 may acquire environment data when the image data on an object is acquired or after the type of an object is identified. In other words, the environment data acquisition module 21 only has to acquire environment data before the status of an object is diagnosed. The sensors may detect environment data other than the above-mentioned examples. The position where a sensor is placed is not limited to the above-mentioned examples and may be appropriately changed to the position where a sensor can detect the environment where an object is placed.

The diagnosis module 43 diagnoses the status of an object based on the identified type, the identified abnormal part, and the acquired environment data (Step S19). In the step S19, the diagnosis module 43 diagnoses the status of an object based on the diagnosis database stored in the memory module 30, in which the type of an object is associated with an abnormal part of the object, environment data of the object, and a diagnosis result. The diagnosis module 43 identifies a part corresponding to the combination of the identified type, the identified abnormal part, and the acquired environment data by referring to the diagnosis database. The diagnosis module 43 extracts a diagnosis result corresponding to the part. The diagnosis module 43 diagnoses the extracted diagnosis result as the status of the object.

The diagnosis module 43 may diagnose the status of an object based on any one or the combination of any of the identified type, the identified abnormal part, and the acquired environment data. In this case, the diagnosis module 43 may calculate the probability of each diagnosis result based on the information when extracting two or more diagnosis results. For example, if obtaining two or more diagnosis results from the identified abnormal part, the diagnosis module 43 calculates the probability of each diagnosis result based on the match rate of the environment data. If obtaining two or more diagnosis results from the acquired environment data, the diagnosis module 43 may calculate the probability for each diagnosis result after previously setting a weight for each of environment data and associating the weight with a probability. The diagnosis module 43 may calculate the probability by another method.

Diagnosis Database

Figure 10:
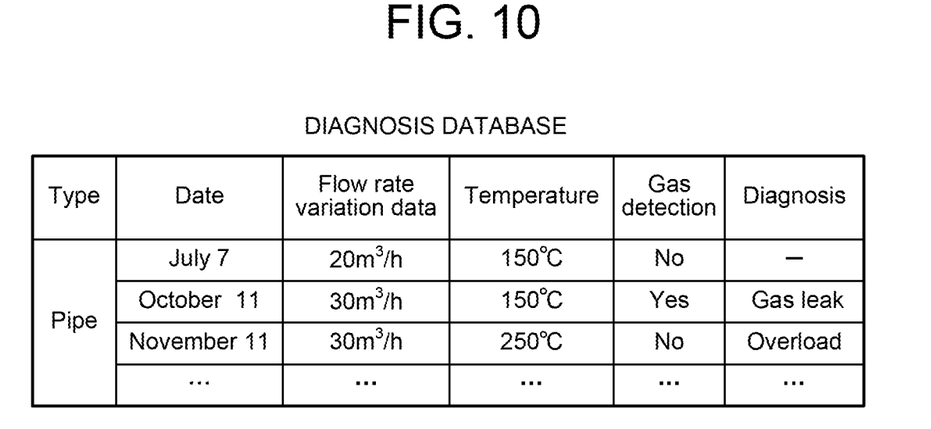
FIG. 10 shows one example of the diagnosis database stored in the computer 10.

The diagnosis database that the memory module 30 stores will be described below with reference to FIG. 10. FIG. 10 shows one example of the diagnosis database stored in the memory module 30. In FIG. 10, the memory module 30 associates and stores information to identify an object, such as the type, with environment data indicating a date, flow rate variation data, a temperature, environment data of the object such as gas detection, and information indicating a diagnosis result. The type is of an object. The date is the date on which a visible light image was acquired. The flow rate variation data is acquired on the date. The temperature is thermal data on the date. The gas detection is whether or not gas was detected on the date. The diagnosis is the status of an object. In the diagnosis database, the type is associated with the normal status and the abnormal status of an object. If an object is in the normal status, the memory module 30 associates and stores the type of the object with the diagnosis result of no applicability. If an object is in an abnormal status, the memory module 30 associates and stores the type of the object with a specific diagnosis result.

The information stored in a diagnosis database is not limited to information to identify an object, environment data, and information indicating a diagnosis result. The diagnosis database may store additional information or may omit some of the data. The number of the types or the classifications of an object is not limited to the above-mentioned examples and may be more or less than that shown in the examples. The diagnosis database may be created for each object or each classification.

The learning module 44 learns a diagnosis result (Step S20). In the step S20, the learning module 44 learns a diagnosis result based on environment data and the feature amounts of a visible light image and an infrared image. Specifically, the learning module 44 learns the combination of environment data, an image, and a diagnosis result in the diagnosis database that the memory module 30 stores as teacher data and generates diagnosis judgement data. The memory module 30 stores the generated diagnosis judgement data. The diagnosis module 43 judges the diagnosis result based on the learnt diagnosis judgement data when acquiring a new image.

In the above-mentioned embodiment, the object is assumed to be a plant facility with a pipe. However, examples of the object may include electrical appliances such as a mobile phone, a mobile information terminal, a tablet terminal, a net book terminal, a slate terminal, an electronic book terminal, and a portable music player, wearable terminals such as smart glasses and a head mounted display, various sensors, and IoT (Internet of Things) devices such as robots. Examples of the object may also include the pipes of a plant, plumbing facilities, drainage facilities, power receiving facilities, substation facilities, power transmitting facilities, pump facilities, fire-prevention facilities, boiler facilities, high-pressure gas facilities, and high-pressure air facilities. Examples of the object may also include moving vehicles such as cars, airplanes, ships, and buses. Examples of the object may also include the architectural structures such as houses, hospitals, clinics, stations, airports, buildings, ministry offices, police stations, fire stations, police boxes, sports stadium, baseball fields, hotels, warehouses, schools, public restrooms, stores, and restaurants.

To achieve the means and the functions that are described above, a computer (including a CPU, an information processor, and various terminals) reads and executes a predetermined program. For example, the program may be provided through Software as a Service (SaaS), specifically, from a computer through a network or may be provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for diagnosing an object
10 Computer

What is claimed is:

1. A computer system comprising:
a processor that:
acquires a visible light image of an object taken by a visible camera and an infrared image of the object taken by an infrared camera;
analyzes the acquired visible light image by comparing the acquired visible light image with a normal visible light image of the object;
identifies a type of the object based on a result of the image analysis;
identifies a plurality of areas that correspond to a plurality of predetermined parts of the object in the visible light image, respectively;
identifies each of a plurality of areas in the infrared image that correspond to the identified areas in the visible light image, respectively;
identifies an abnormal part among the predetermined parts of the object based on a temperature of each of the identified areas in the infrared image;
acquires environment data of the object; and
diagnoses a status of the object based on the identified type, the temperature of the identified abnormal part, and the acquired environment data.

2. The computer system according to claim 1, wherein the object to be diagnosed is a plant facility with a pipe, and the processor acquires at least one environmental datum from a group including a date on which the visible light image has been acquired, flow rate variation data that indicates change in flow rate in the pipe on the date, thermal data on the date, and gas data on the date.

3. A method for diagnosing an object that is executed by a computer system, comprising the steps of:
acquiring a visible light image of an object taken by a visible camera and an infrared image of the object taken by an infrared camera;
analyzing the acquired visible light image by comparing the acquired visible light image with a normal visible light image of the object;
identifying a type of the object based on a result of the image analysis;
identifying a plurality of areas that correspond to a plurality of predetermined parts of the object in the visible light image, respectively;
identifying each of a plurality of areas in the infrared image that correspond to the identified areas in the visible light image, respectively;
identifying an abnormal part among the predetermined parts of the object based on a temperature of each of the identified areas in the infrared image;
acquiring environment data of the object; and
diagnosing a status of the object based on the identified type, the temperature of the identified abnormal part, and the acquired environment data.

4. A program stored on a non-transitory computer readable medium for causing a computer system to execute the steps of:
acquiring a visible light image of an object taken by a visible camera and an infrared image of the object taken by an infrared camera;
analyzing the acquired visible light image by comparing the acquired visible light image with a normal visible light image of the object;
identifying a type of the object based on a result of the image analysis;
identifying a plurality of areas that correspond to a plurality of predetermined parts of the object in the visible light image, respectively;
identifying each of a plurality of areas in the infrared image that correspond to the identified areas in the visible light image, respectively;
identifying an abnormal part among the predetermined parts of the object based on a temperature of each of the identified areas in the infrared image;
acquiring environment data of the object; and
diagnosing a status of the object based on the identified type, the temperature of the identified abnormal part, and the acquired environment data.

5. The computer system according to claim 1, wherein the processor identifies each of the plurality of areas in the infrared image by:
acquiring, as a coordinate, a position of each of the identified areas in the visible light image; and
identifying a position of the acquired coordinate as each of the areas in the infrared image that correspond to the identified areas in the visible light image, respectively.

6. The computer system according to claim 1, wherein the processor compares the acquired visible light image with the normal visible light image of the object by:
recognizing a shape of the object included in the acquired visible light image; and
comparing the shape of the object included in the acquired visible light image with a shape of the object in the normal visible light image.

7. The computer system according to claim 1, wherein the processor compares the acquired visible light image with the normal visible light image of the object by:
recognizing a shape and RGB (red, green and blue) values of the object included in the acquired visible light image; and comparing the shape and RGB values of the object included in the acquired visible light image with a shape and RGB values of the object in the normal visible light image.

8. The method according to claim 3, wherein identifying each of the plurality of areas in the infrared image comprises:
acquiring, as a coordinate, a position of each of the identified areas in the visible light image; and
identifying a position of the acquired coordinate as each of the areas in the infrared image that correspond to the identified areas in the visible light image, respectively.

9. The method according to claim 3, wherein comparing the acquired visible light image with the normal visible light image of the object comprises:
recognizing a shape of the object included in the acquired visible light image; and
comparing the shape of the object included in the acquired visible light image with a shape of the object in the normal visible light image.

10. The method according to claim 3, wherein comparing the acquired visible light image with the normal visible light image of the object comprises:
recognizing a shape and RGB (red, green and blue) values of the object included in the acquired visible light image; and
comparing the shape and RGB values of the object included in the acquired visible light image with a shape and RGB values of the object in the normal visible light image.

11. The program according to claim 4, wherein identifying each of the plurality of areas in the infrared image comprises:
acquiring, as a coordinate, a position of each of the identified areas in the visible light image; and
identifying a position of the acquired coordinate as each of the areas in the infrared image that correspond to the identified areas in the visible light image, respectively.

12. The program according to claim 4, wherein comparing the acquired visible light image with the normal visible light image of the object comprises:
recognizing a shape of the object included in the acquired visible light image; and
comparing the shape of the object included in the acquired visible light image with a shape of the object in the normal visible light image.

13. The program according to claim 4, wherein comparing the acquired visible light image with the normal visible light image of the object comprises:
recognizing a shape and RGB (red, green and blue) values of the object included in the acquired visible light image; and
comparing the shape and RGB values of the object included in the acquired visible light image with a shape and RGB values of the object in the normal visible light image.

* * * * *